July 5, 1949.  R. C. HART ET AL  2,475,388
WATERING MACHINE

Filed Dec. 30, 1944  13 Sheets-Sheet 1

INVENTORS
Richard C. Hart
BY John A. Bittel
Harold E. Stonebraker
Their Attorney

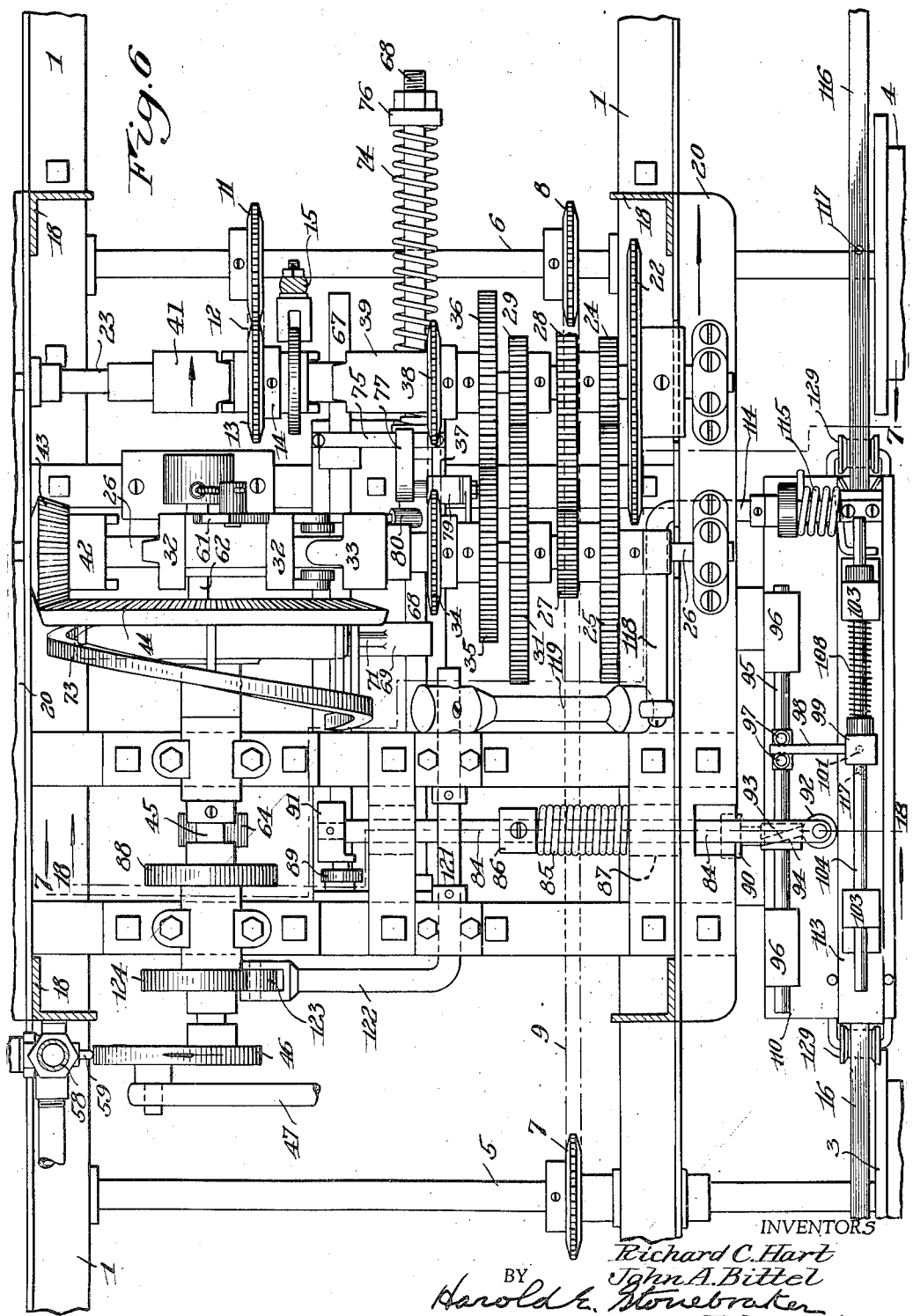

July 5, 1949.  R. C. HART ET AL  2,475,388
WATERING MACHINE
Filed Dec. 30, 1944  13 Sheets-Sheet 7
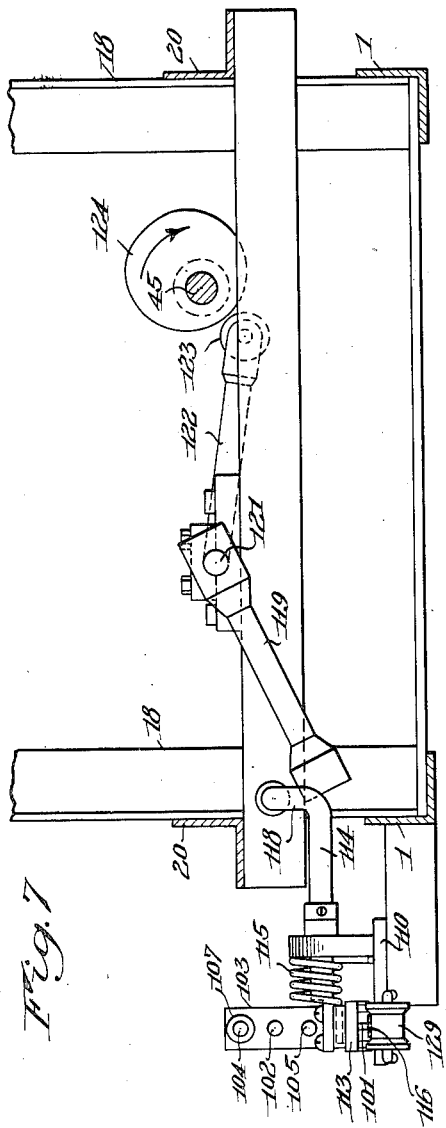
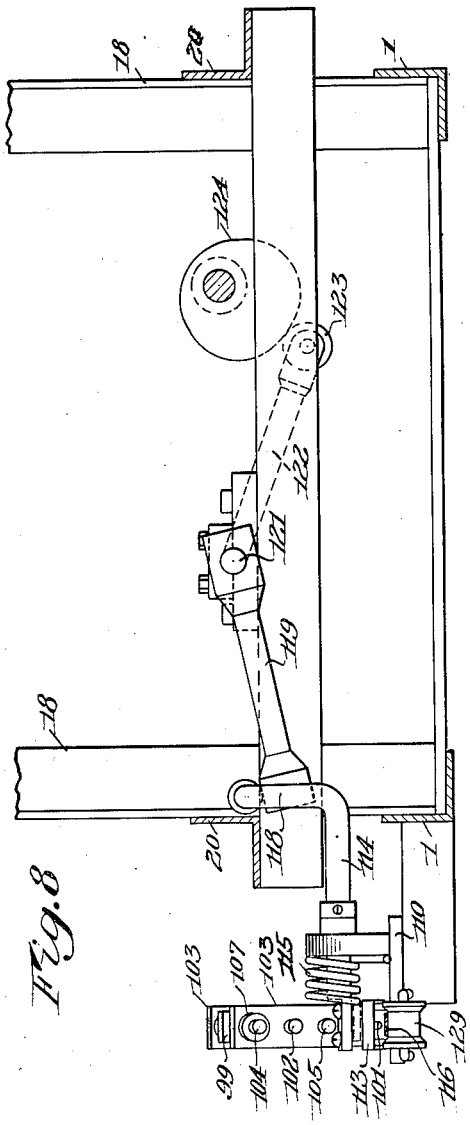
INVENTORS
Richard C. Hart
John A. Bittel
BY Harold E. Stonebraker
their Attorney

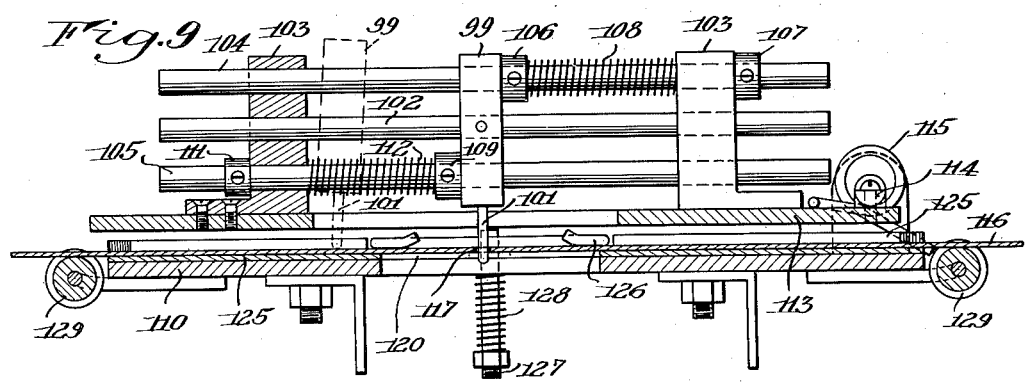
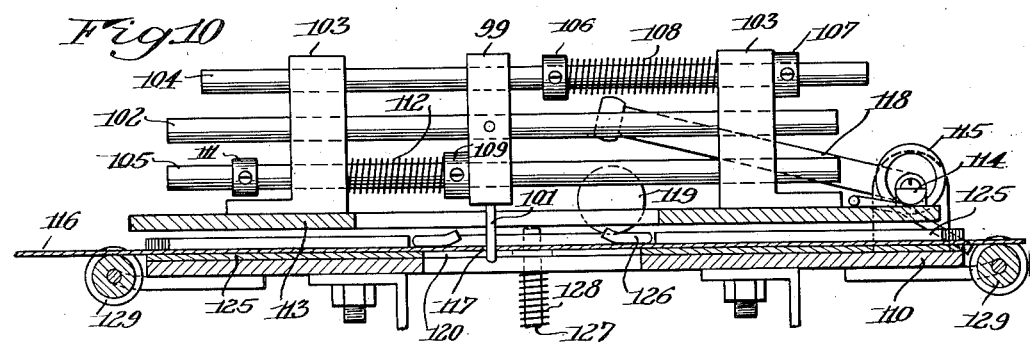
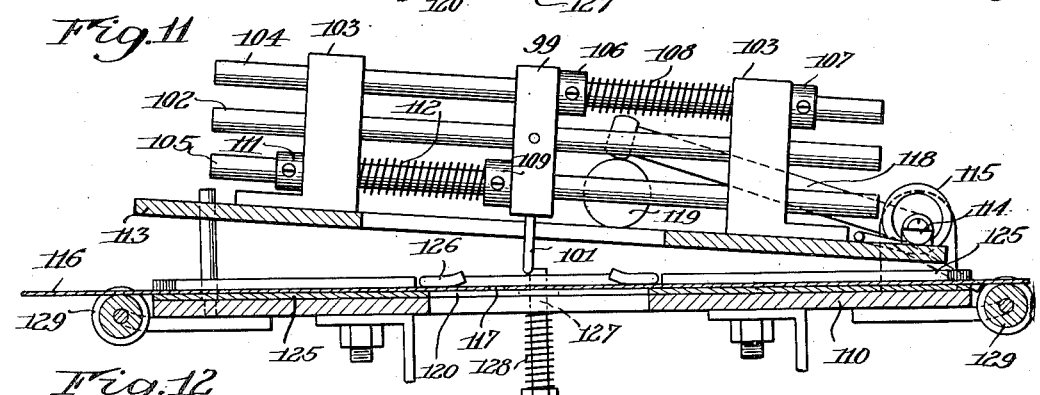
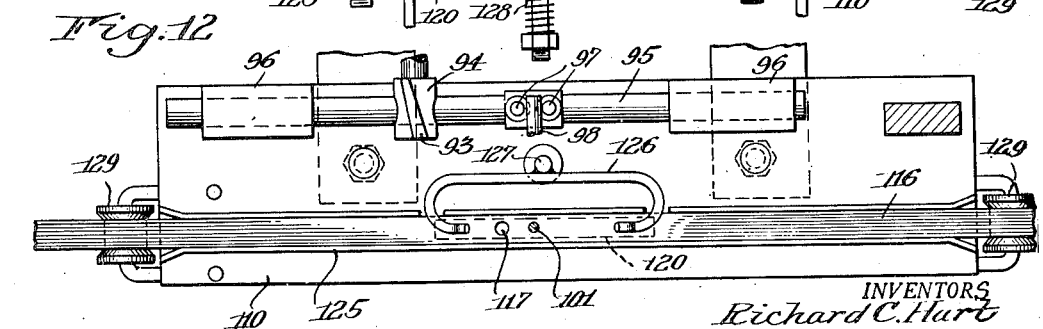

July 5, 1949.　　　　R. C. HART ET AL　　　　2,475,388
WATERING MACHINE

Filed Dec. 30, 1944　　　　　　　　　　13 Sheets-Sheet 9

INVENTORS
Richard C. Hart
BY John A. Bittel
Harold E. Stonebraker
their Attorney

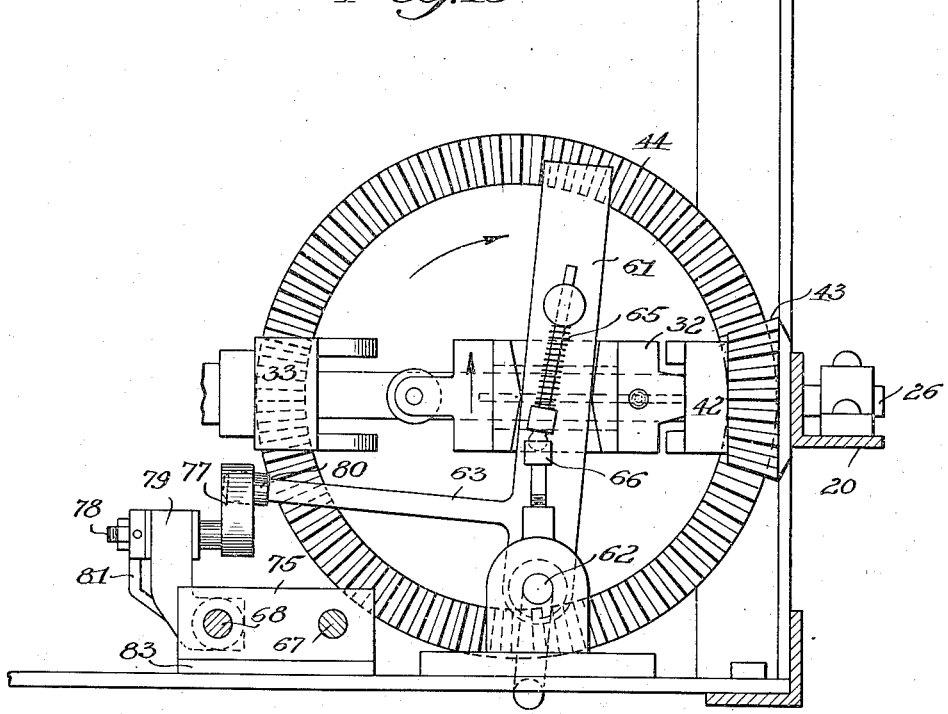

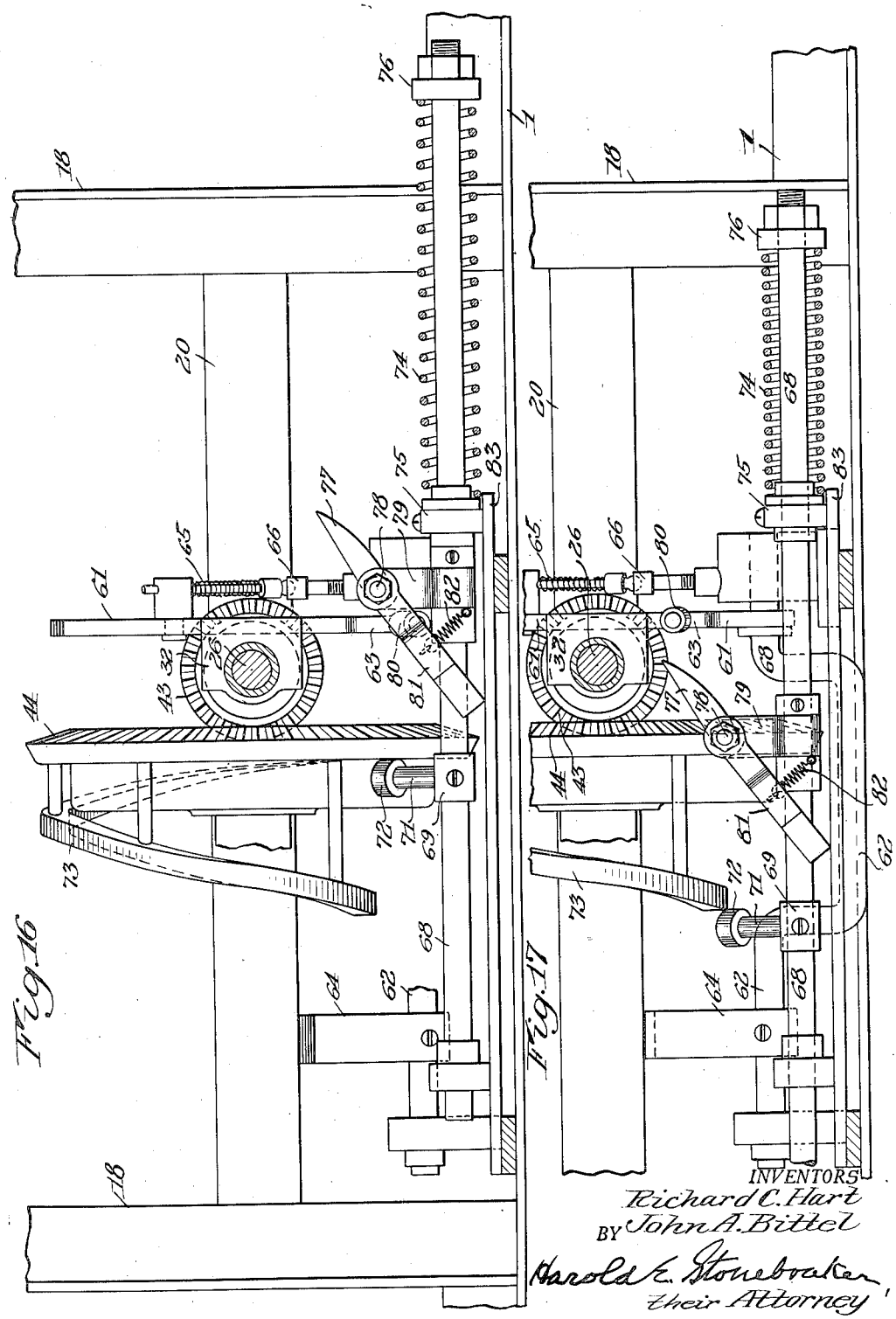

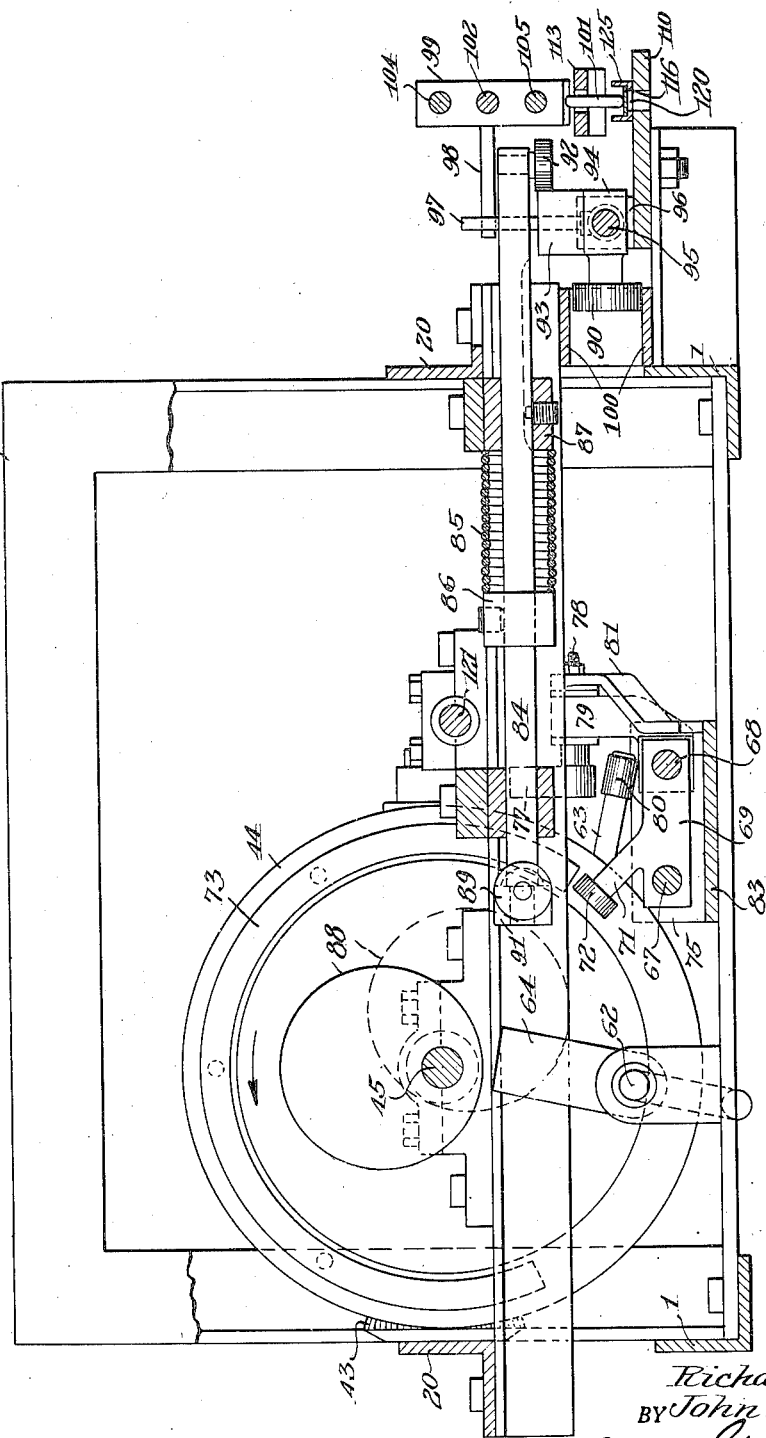

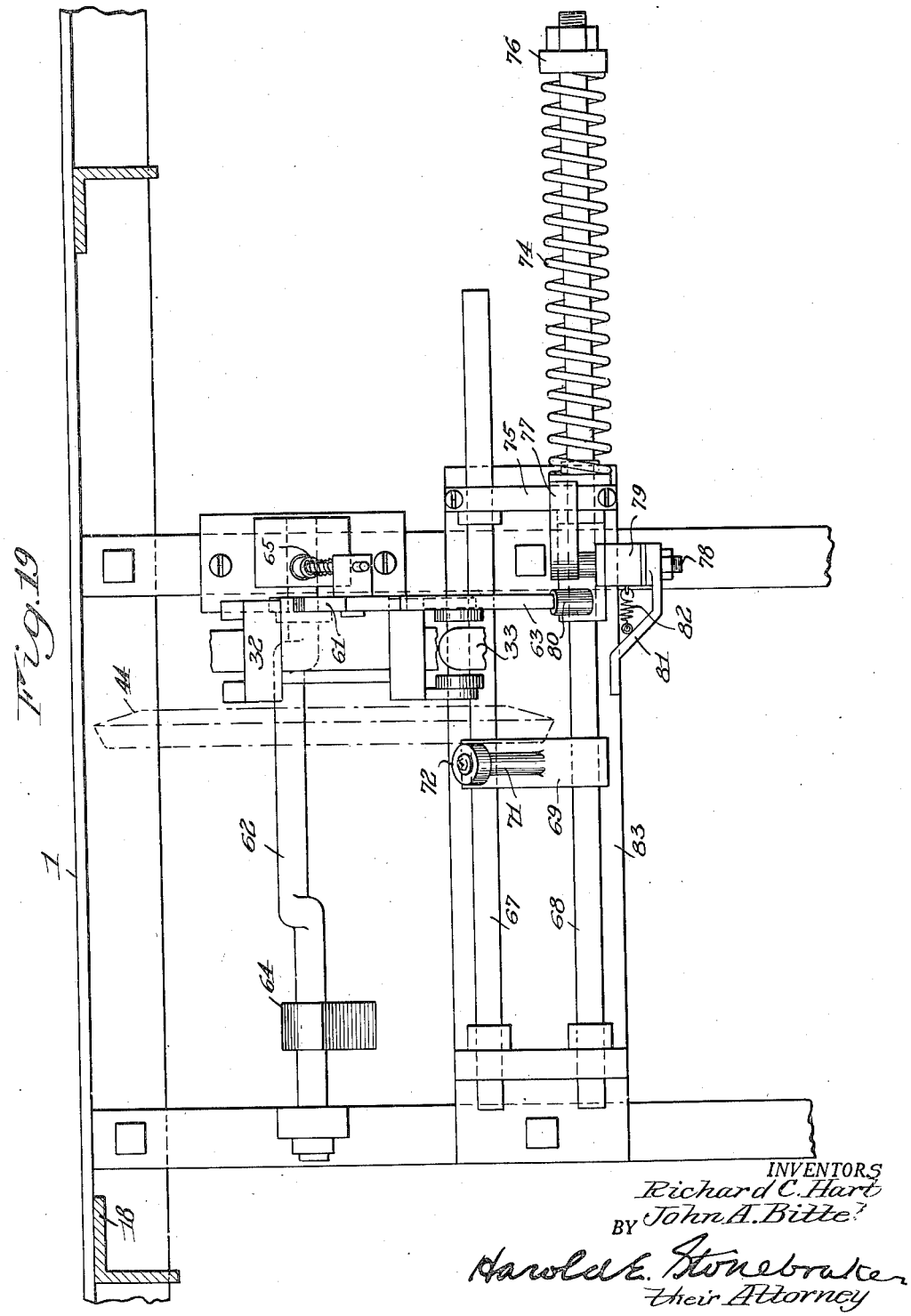

Patented July 5, 1949

2,475,388

UNITED STATES PATENT OFFICE 2,475,388

WATERING MACHINE

Richard C. Hart, Fairport, and John A. Bittel, Rochester, N. Y., assignors to Geo. B. Hart, Inc., Rochester, N. Y., a corporation of New York Application December 30, 1944, Serial No. 570,650

15 Claims. (Cl. 299—47)

This invention relates to a watering machine, and has for its purpose to provide an apparatus particularly adapted for use in greenhouses for watering the earth or plants by a portable self-controlled automatic mechanism.

More particularly, the invention has for its purpose to afford a structure including a carriage adapted to travel along tracks such as are afforded by the side rails of the tables on which the plants are supported, the carriage being provided with watering mechanism that is automatically operated at predetermined intervals, while the carriage moves forwardly between successive watering operations.

A further purpose of the invention is to afford a construction in which such a traveling carriage and watering mechanism is controlled by means disposed along the path of travel of the carriage and consisting of a multiplicity of stations at each of which the carriage is automatically brought to a standstill, the watering mechanism is operated to wet a given area, and the travel of the carriage automatically resumed to move it to another station.

An additional object of the invention is to provide a machine that is self-contained and automatic in all its operations, and only requires being placed in position on the supporting tracks and started in either selected direction, after which the cycle of movements takes place and is repeated as long as the motor remains connected to the carriage drive.

A further purpose is to provide a machine which is controlled by a metal tape or strip fixed along the path of travel of the carriage and provided with holes that determine the stopping and watering points of the machine through cooperation with a control member on the carriage.

To these and other ends, the invention consists in the construction and arrangement of parts that will appear from the following description when read in conjunction with the accompanying drawings, the novel features being pointed out in the claims following the specification.

In the drawings:

Fig. 6 is a similar view with parts omitted showing the clutch-shifting member in its operative or outermost position with its operating spring compressed, and held by the detent in the position occupied after completion of the watering cycle and during travel of the carriage;

Fig. 7 is a vertical sectional view on line 7—7 of Fig. 6 looking from right to left, and showing in its lowermost position the elevating arm for the control pin carrier;

Fig. 8 is a similar view showing the elevating arm in its uppermost position to which it is operated by its cam to raise the control pin out of engagement with the control strip or tape;

Fig. 9 is a vertical sectional view, partially in elevation, showing in dotted lines the control pin in the position it assumes when resting on the control tape during travel of the carriage, and in full lines the position it assumes upon reaching a hole in the tape and dropping therein preliminarily to stopping movement of the carriage;

Fig. 10 is a similar view showing the position of the same parts as in Fig. 9 after the carriage has moved slightly to release the clutch-shifting member, the control pin meantime remaining engaged in the hole in the control tape against the tension of one of its springs;

Figure 13:
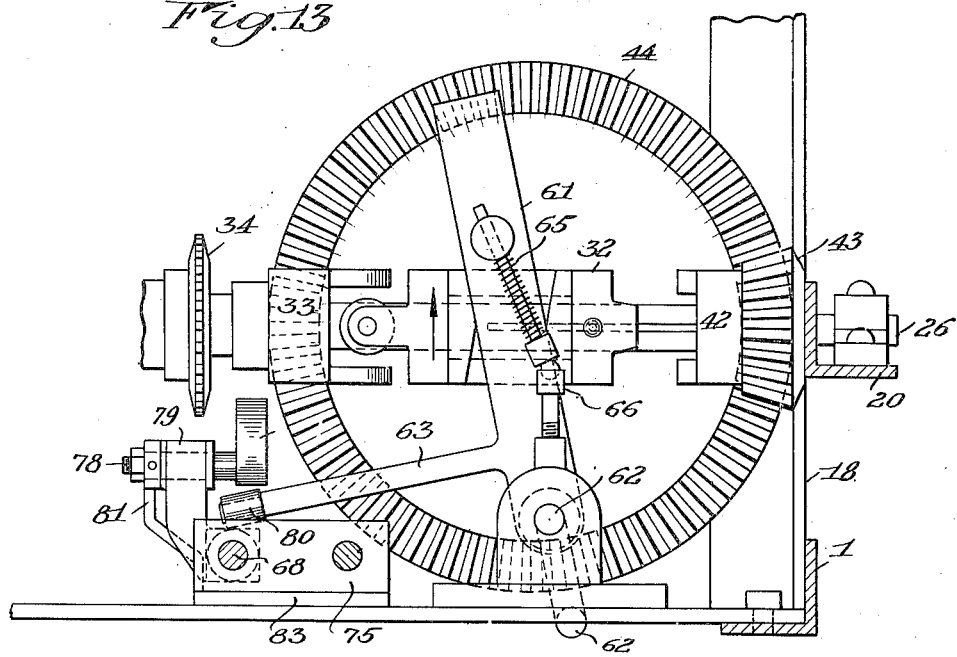
Figure 14:
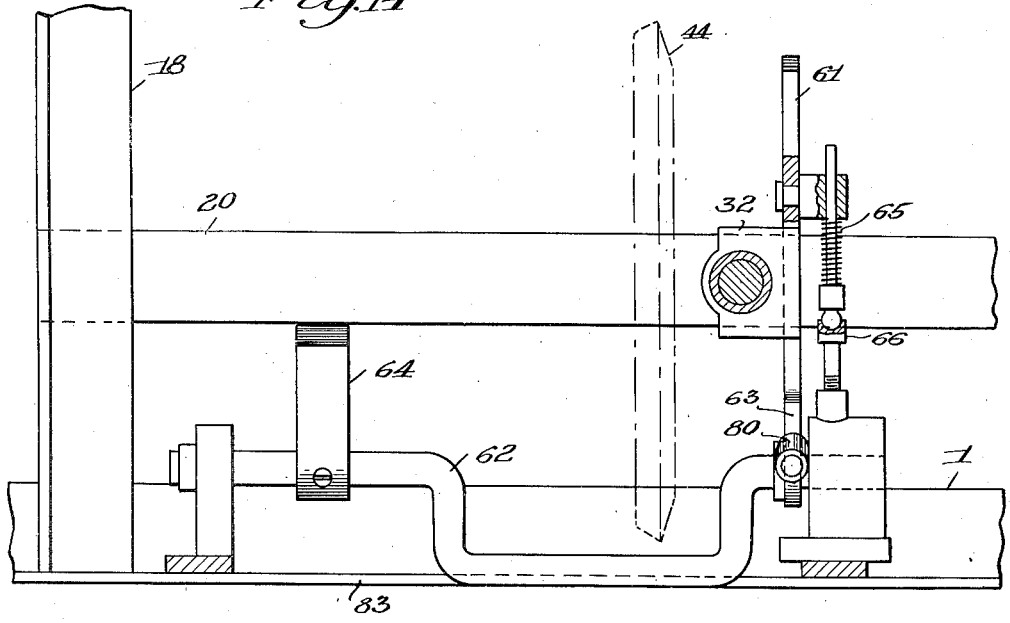

Fig. 11 is a similar view showing the position of the parts after the carriage has stopped and the watering cycle has started, the control pin being elevated out of engagement with the hole in the control tape and thereupon moved by its spring to its normal intermediate position where it is slightly beyond the hole in the control tape, previously to dropping into engagement with the top surface of the control tape for movement thereon during the next travel cycle of the carriage;

Fig. 12 is a plan view of the support for the control pin carrier, the track for the control tape, and the movable detent which governs the clutch-shifting member;

Fig. 13 is a transverse vertical sectional view showing the clutch mechanism and part of the clutch-shifting mechanism in end elevation after having moved the clutch to position for actuating the carriage-driving mechanism;

Fig. 14 is a longitudinal vertical sectional view showing in side elevation the clutch, clutch lever, and the oscillatory shaft on which the clutch lever is mounted;

Fig. 15 is a view similar to Fig. 13, showing the clutch shifted into position for effecting operation of the watering mechanism during the watering cycle;

Fig. 16 is a longitudinal vertical sectional view showing in side elevation the clutch-shifting mechanism in the same position as in Fig. 13, with the clutch in carriage-driving position, the operating arm of the clutch-shifting mechanism appearing in dotted lines in position just before release by its cam;

Fig. 17 is a similar view showing the clutch-shifting mechanism in position just before release by its cam and the actuating spring compressed;

Fig. 18 is a detail sectional view through the came shaft, taken on line 18—18 of Fig. 6, and Fig. 19 is a horizontal sectional view showing in elevation a part of the clutch-shifting mechanism.

The structure comprises in general a traveling carriage adapted to move in either direction on the tracks constituted by adjacent rails of greenhouse tables, the carriage straddling the aisle or walk between the tables, and moving along to water automatically the soil or plants supported on the tables. The carriage is provided with watering mechanism including a watering head that is automatically moved from a vertical position laterally to a position over the table, and retracted to vertical position during a watering cycle, the water supply being turned on and cut off at proper intervals by automatic mechanism, all of which is controlled from a motor or power unit mounted on the carriage, while water is supplied through a flexible hose extending from the carriage to a source of water supply. The carriage may be propelled by the same motor that operates the watering mechanism, and its movement controlled through a punched metal tape or strip, or other suitable control means located alongside the path of travel of the carriage, each hole in the tape representing a station at which the carriage remains stationary during a watering cycle. The carriage travels along until a control pin riding along on the tape drops into one of its holes, whereupon the carriage is automatically stropped and the watering mechanism goes through its cycle, upon the completion of which the watering mechanism automatically stops and travel of the carriage is resumed, the control pin having meantime been lifted out of its hole during the watering cycle and moved slightly beyond the hole in readiness to be carried along on the surface of the tape with the carriage until another hole is reached.

Figure 1:
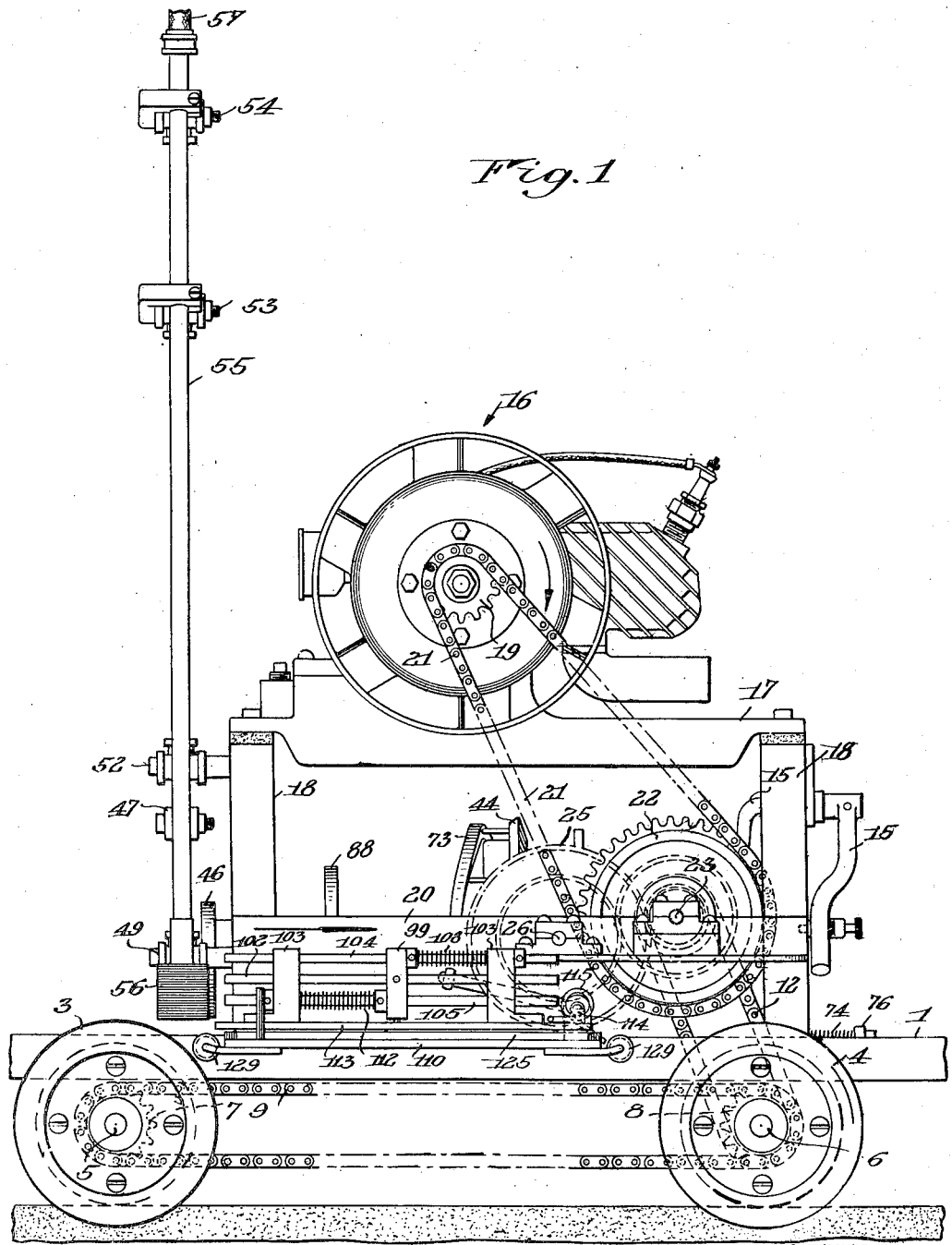
Fig. 1 is a view in side elevation showing a machine constructed in accordance with one practical embodiment of the invention and positioned on the tracks along which it travels.
Figure 2:
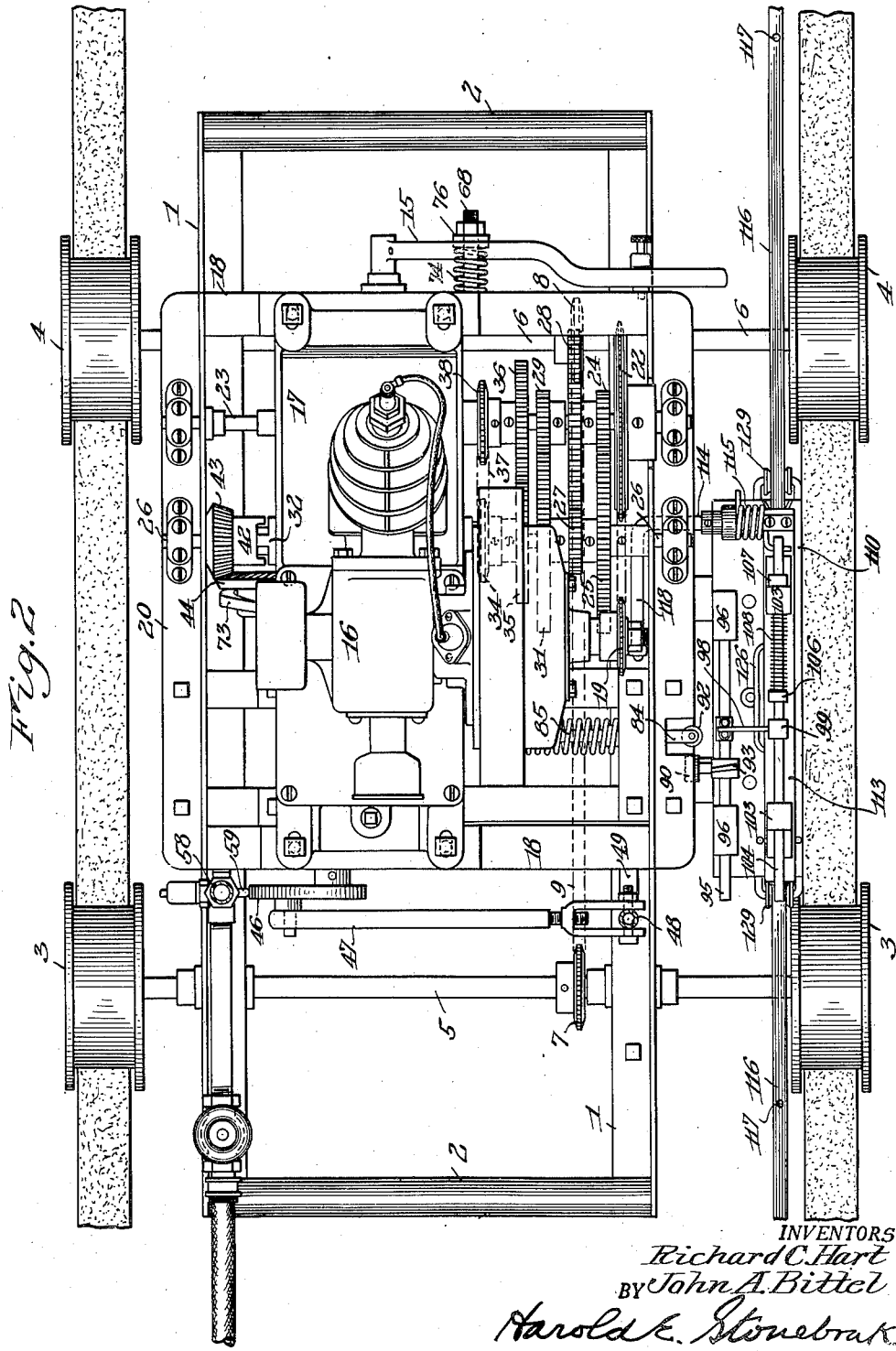
Fig. 2 is a plan view of the same.
Figure 3:
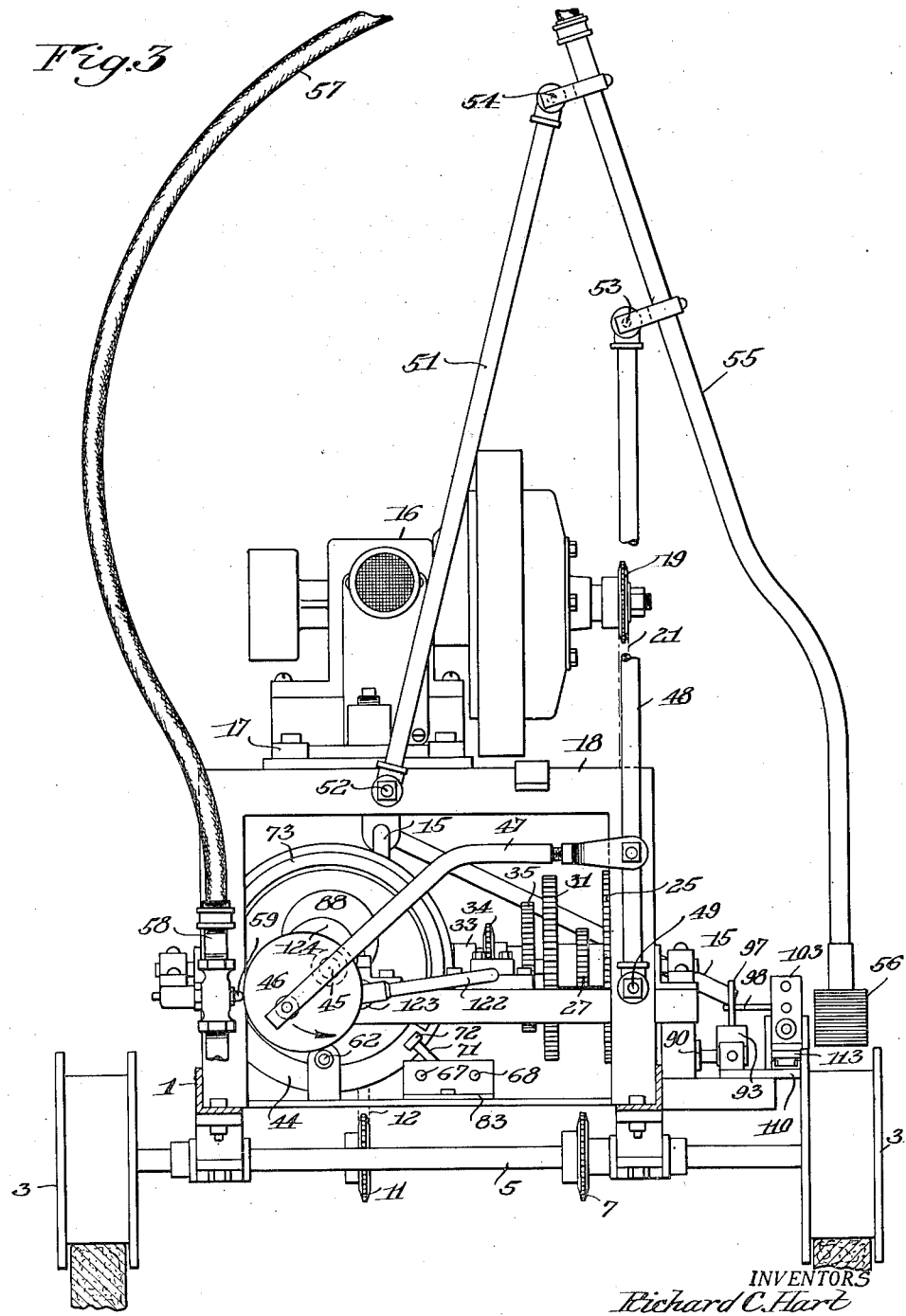
Fig. 3 is a view in end elevation of the machine, showing the watering head in its inoperative vertical position over the carriage.

The objectives of the invention may be carried out in a variety of ways, and in the structure disclosed, which is illustrative of one practical embodiment, the carriage includes a chassis formed by longitudinal angle irons 1 and transverse angle irons 2, see Figs. 1 to 3, while 3 and 4 designate wheels mounted on axles 5 and 6 respectively which are suitably mounted on the chassis. The axles 5 and 6 are provided with sprocket wheels 7 and 8 respectively connected by a chain 9, see Fig. 1, for driving the carriage in either direction, as will appear more clearly presently. The axle 6 also carries a sprocket wheel 11, see Fig. 5, which is driven in either direction by means of a chain 12, see Figs. 1 and 5, connected with a sprocket wheel 13 that is mounted on a reversibly rotatable clutch sleeve 14, operable by a manually controlled lever 15 to determine the direction of travel of the carriage.

Figure 5:
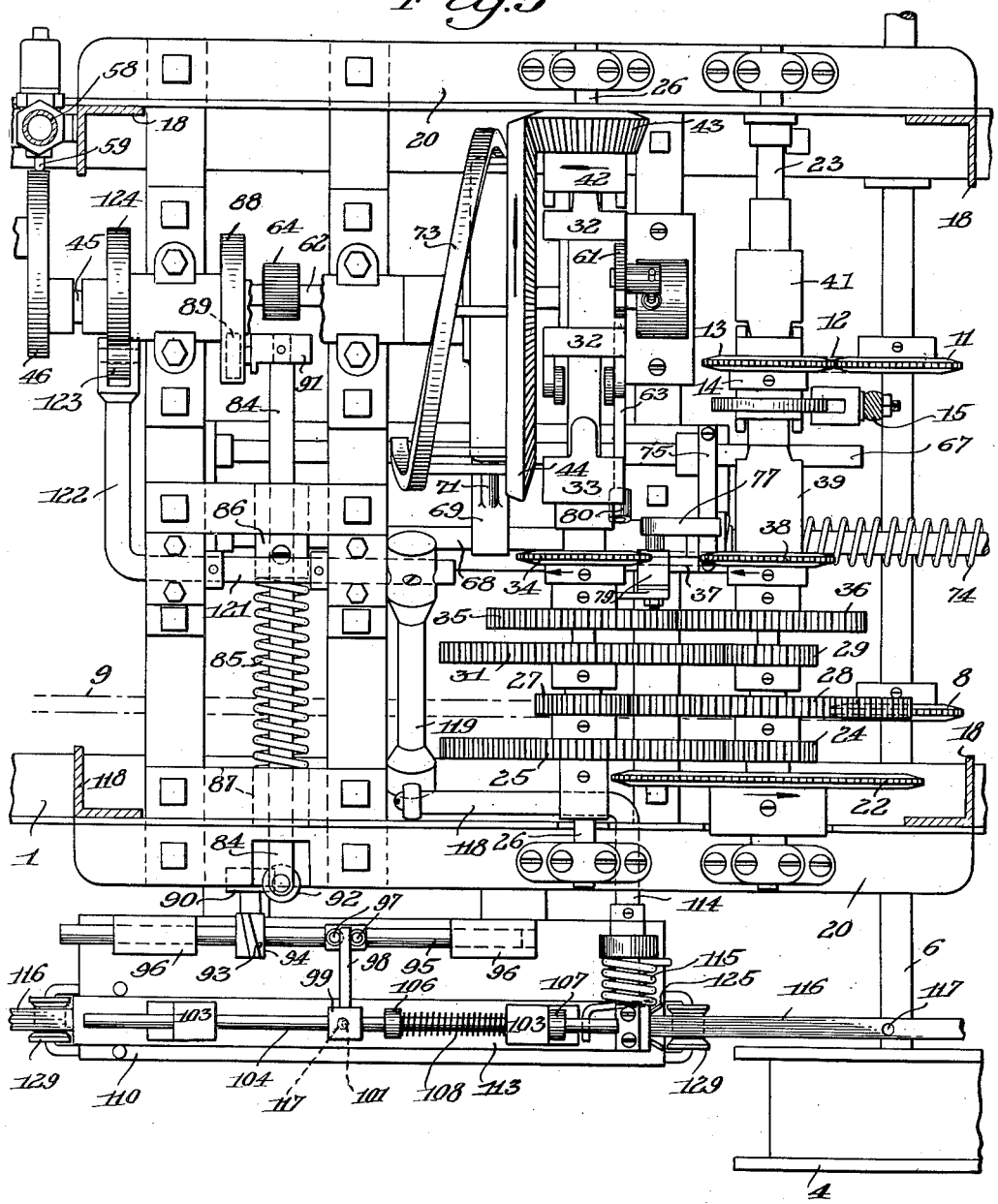
Fig. 5 is a horizontal sectional view showing the carriage-driving mechanism, clutch mechanism, the cam shaft of the watering mechanism, and the control mechanism in elevation, the clutch-shifting member which stops movement of the carriage appearing in its inoperative position as at the beginning of the watering cycle.

The carriage is driven by means of an engine 16 or other suitable motor mounted on a platform 17 that is supported on the uprights 18 carried by the chassis. 19 designates a sprocket wheel mounted on the engine shaft and connected by chain 21 with a sprocket wheel 22, see Figs. 1, 2 and 5. The sprocket wheel 22 is fixed to a sleeve that turns on the shaft 23 which is mounted in suitable bearings on lateral supports 20 carried by the chassis, and the sleeve carrying sprocket wheel 22 also has fixed thereto a pinion 24 that drives a gear wheel 25. The gear wheel 25 is fixed to a sleeve that rotates on the shaft 26 which is mounted in suitable bearings on the supports 20, and the sleeve carrying gear wheel 25 has fixedly connected thereto the pinion 27 that engages a gear 28 fixed to a sleeve that is rotatable on the shaft 23 and also carries a pinion 29 which engages and drives the gear 31 that is fixedly mounted on the shaft 26.

Shaft 26 is the continuously rotating power shaft that transmits movement through an automatically shifting clutch to the watering mechanism and to the carriage-driving mechanism alternately, and to accomplish this, a clutch 32 is slidably keyed on shaft 26, the clutch being shifted back and forth in a manner that will be described hereinafter. When in one position for operating the carriage-driving mechanism, the clutch 32 engages a clutch face on a sleeve 33, rotatably mounted on shaft 26. The sleeve 33 has fixed thereon the sprocket wheel 34 and gear 35. the gear 35 engages a gear 36 fixed on the shaft 23 while sprocket wheel 34 is connected by a chain 37 with a sprocket wheel 38 carried by a sleeve 39 which has a clutch face for engagement with the aforementioned slidable clutch sleeve 14. When sleeve 14 is engaged with sleeve 39, it drives the carriage in one direction, while 41 designates a clutch element fixed on shaft 23 and operating when the clutch sleeve 14 is shifted into engagement therewith to drive the sprocket wheel 13 and the carriage in the opposite direction. By manually shifting the clutch sleeve 14 in one direction or the other, the direction of travel of the carriage can be controlled and its movement reversed, and the carriage is driven as long as clutch 32 is engaged with sleeve 33.

When movement of the carriage is interrupted in a manner that will be described presently, the clutch 32 is automatically shifted to engage a sleeve 42 that is rotatable on the shaft 26 and carries a bevel pinion 43 engaging a bevel gear 44 which is fixed on the rotatable cam shaft 45 which is mounted in suitable bearings mounted on the chassis and forms part of the watering mechanism. The cam shaft 45 is rotated once by bevel pinion 43 and bevel gear 44 to complete each watering cycle, during which a watering head is moved laterally over the table or area to be watered and the watering operation completed for one station.

Figure 4:
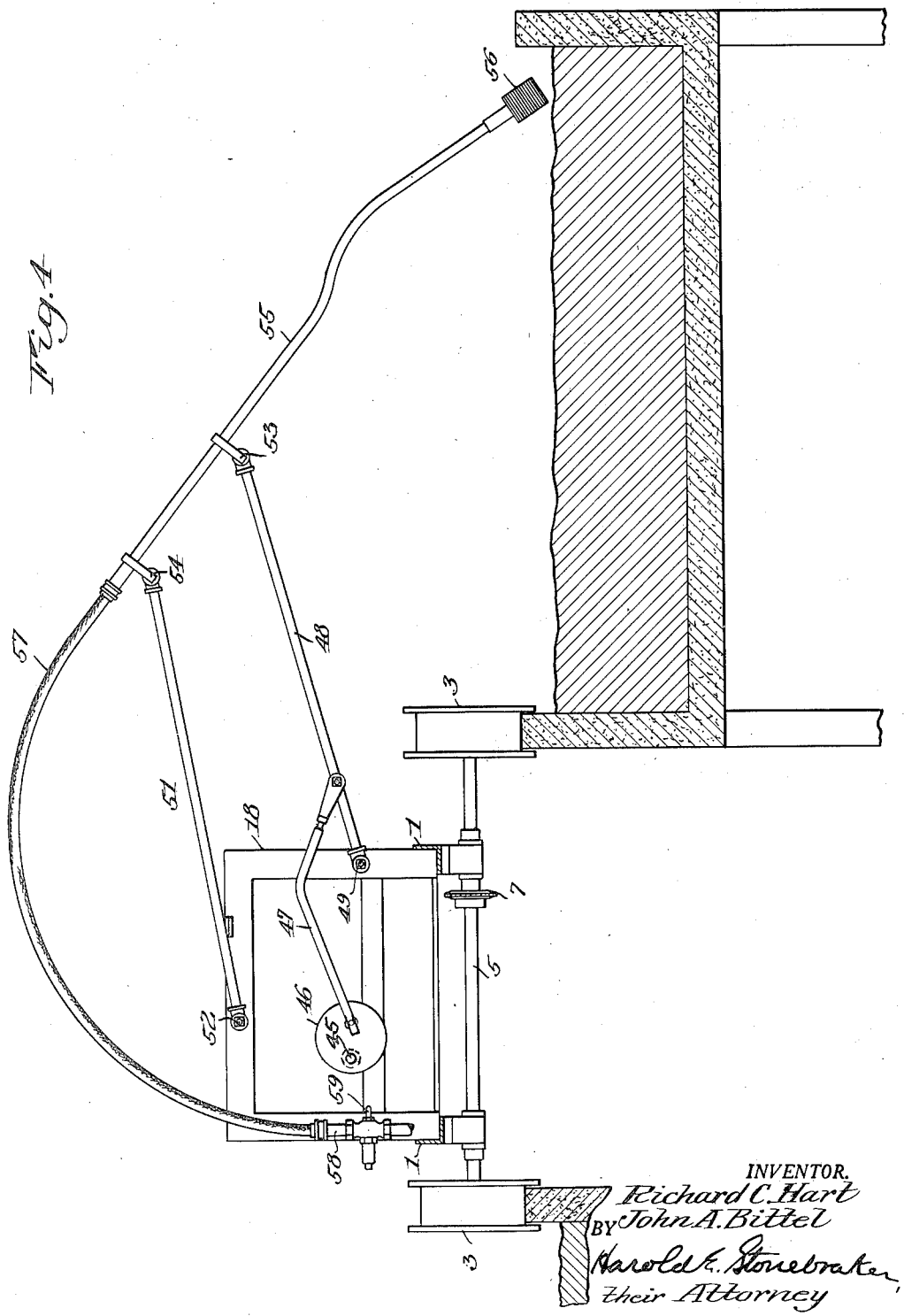
Fig. 4 is a similar end view, with parts of the machine omitted, and showing the watering head extended laterally in operative position over the bed to be watered.

To accomplish this, the cam shaft 45 is provided with a cam 46 fixed thereon, see Fig. 3, to which is pivotally connected a crank arm 47, the opposite end of which is pivotally connected to a supporting rod 48 pivotally supported on the frame upright 18 at 49, while 51 designates a second supporting rod pivotally supported on the frame at 52. The supporting rods 48 and 51 are pivotally connected at 53 and 54 respectively to the watering head that includes a pipe 55 with a discharge outlet or nozzle 56 of suitable construction at its outer end, and with its inner end constructed to receive a flexible hose 57 that leads to a water connection 58 in a pipe line on the carriage. The connection 58 includes a valve, and valve rod 59 engaging the outer periphery of the cam 46, which is so designed as to open the valve at the beginning of the outward movement of the watering head from the position shown in Fig. 3, so that the valve is fully open when the watering head reaches its laterally extended outermost position, as illustrated in Fig. 4. The cam 46 again closes the valve by the time the watering head has been returned to its initial upright position, the pipe line on the carriage being connected to a source of water supply by means of a flexible hose that trails along with the carriage and is unnecessary to show in detail as it forms no particular part of the present invention.

When the watering cycle is completed, it is necessary to shift the clutch 32, see Fig. 5, from the position in which it drives the bevel pinion 43 to the position where it drives sleeve 33 and operates the carriage-driving mechanism, and it is therefore necessary to effect automatic shifting of the clutch 32 at the end of the watering cycle and automatically to shift it back when the carriage reaches the next station or watering point. This is accomplished by providing clutch 32 with a shifting lever 61, see Fig. 13, that is fixedly mounted on rock shaft 62, supported in suitable bearings, see Figs. 13 and 18, and the shifting lever 61 is provided with an arm 63 that is engaged and operated at the end of the watering cycle to shift the clutch 32 into position for operating the carriage-driving mechanism, while rock shaft 62 is provided with a crank arm 64 that is engaged and operated when the carriage stops to shift the clutch 32 over into position for operating the watering mechanism, and these operations are effected by the mechanism and in the manner that will now be described.

The clutch 32 is illustrated in Fig. 13 in carriage-driving position, 65 indicating a spring forming part of a follower connecting the lever 61 with a stationary support 66 and acting to hold the lever 61 in either shifted position. In order to shift the arm 63 downwardly into the position shown from its upper position at the end of the watering cycle, clutch-shifting mechanism is provided that includes a spring-controlled actuator, the spring of which is compressed for tensioning during the watering cycle and is released at the end of the watering cycle to move the clutch. This is accomplished by means of a slidable frame, see Figs. 16 and 19, that includes the rods 67 and 68 slidable in suitable guides mounted on the chassis and connected by means of a cross-member 69, see Fig. 19. The clutch-shifting frame also includes an operating arm 71 carried by the cross-member 69 and provided with an anti-friction roller 72 that is positioned for engagement with a cam 73 suitably fixed to the bevel gear 44 or otherwise fixedly mounted on the cam shaft 45, and formed so as to move the roller 72 and clutch-shifting frame endwise from right to left, see Fig. 16, during the watering cycle, and to release the clutch-shifting frame at the end of the watering cycle.

During this endwise movement of the clutch-shifting frame which occurs during the watering cycle, a spring 74 which surrounds the rod 68 and is located between a stationary bracket 75 and a collar 76 fixed on the rod is compressed therebetween, as shown in Fig. 17, so that when the clutch-shifting frame is released by the cam 73, the spring throws the clutch-shifting frame back to its initial position and shifts the clutch to position to operate the carriage-driving mechanism.

This is accomplished by means of a shifting dog 77 fixed to an arbor 78 which is pivoted in a bracket 79 fixedly mounted on the clutch-shifting frame, while 81 designates an offset arm carried by the arbor 78 and connected by a spring 82 to the bracket 79. The spring 82 acts to hold the dog normally in its uppermost position, as illustrated in Fig. 16, and permit it to yield and ride under the anti-friction roller 80 at the outer end of arm 63, see Fig. 15, as the clutch-shifting frame is moved endwise to compress spring 74. During return movement, the arm 81 rests and travels on a stationary supporting plate 83. Thus during the watering cycle, the clutch-shifting frame is moved from right to left, see Fig. 17, to compress spring 74, during which movement the dog 77 moves under the roller 80 at the end of clutch arm 63, see Fig. 15, said arm being in its uppermost position during the watering cycle, and upon completion of the watering cycle, roller 72 rides off of the cam 73 and when thus released, the spring 74 throws the clutch-shifting frame back to its initial position. During this movement, the dog 77 rides over the roller 80 at the outer end of clutch arm 63, and moving the clutch lever 61 shifts the clutch from the watering cycle position to the carriage-driving position. The carriage then travels until it reaches a predetermined station or watering point, where the carriage is stopped and the watering cycle repeated, and the mechanism by which travel of the carriage is stopped and the clutch shifted back to effect operation of the watering mechanism will now be described.

To effect movement of the clutch to stop the carriage, there is provided a spring-operated clutch-shifting member that engages the crank arm 64 on the rock shaft 62, see Fig. 18. The spring which operates this clutch-shifting member is compressed by a cam on cam shaft 45 during rotation of the latter, and the clutch-shifting member held in such position with its spring under tension by a detent that is automatically moved out of engagement therewith to release the spring-operated clutch-shifting member when the carriage reaches a predetermined station.

In the construction shown, this clutch-shifting member includes a rod 84, see Figs. 5, 6 and 18, that is movable in suitable stationary guides and carries a spring 85 located between a collar 86 fixed on the rod 84 and a stationary guide 87 through which the rod moves. The rod 84 is moved outwardly to compress spring 85 by means of cam 88 on the cam shaft 45, said cam engaging an anti-friction roller 89 carried by the head 91 on the rod 84 and located in the path of the cam 88. The rod 84 carries an upwardly offset anti-friction roller 92 at its outer end that is engaged and held by a detent 93, as shown in Fig. 6, when the rod 84 is in its outermost position and the roller 92 behind the detent 93, after completion of the watering cycle.

The detent 93 has a bevelled side face 94 against which roller 92 engages during the outward travel of the rod 84, and when the roller 92 reaches its outermost position, the detent 93 which is normally in the position shown in Fig. 5, slides behind the roller 92 as in Fig. 6, and holds the rod 84 in its outermost position with its spring 85 under compression until the carriage is stopped, whereupon the roller 92 is moved slightly beyond detent 93 in a lateral direction until roller 92 is released, in the manner that will now be described.

To accomplish movement of roller 92 beyond detent 93 as just described, the detent is carried by rod 95 that is slidable in suitable stationary guides 96, the rod being guided by a roller 90 fixed thereto and movable in a track 100. The rod 95 is held in the position illustrated in Fig. 6 by suitable spring mechanism which permits its endwise movement as the rod 84 moves outwardly past the detent 93, and when roller 92 clears the detent 93, the latter returns to initial position and holds the roller 92 and rod 84 in their outermost positions. To accomplish this, the rod 95 is provided with two upstanding spaced guiding memberds 97 to receive therebetween the horizontally and vertically movable arm 98 that is carried by a block 99 which has mounted on its underside the downwardly projecting control pin 101, see Figs. 9 to 12.

The block 99 which carries the control pin 101 has fixed thereto a guide rod 102 traveling in openings in the vertical posts 103, while 104 and 105 designate similar guide rods extending through and slidable in openings in the vertical posts 103 and the block 99. The rod 104 is provided with collars 106 and 107 fixed thereon together with a spring 108 located between the fixed collar 106 and the post 103, while guide rod 105 is provided with collars 109 and 111 fixed thereon, and 112 designates a spring located between the collar 109 and the adjacent post 103.

The posts 103, guide rods 102, 104 and 105, and the block 99 with the control pin 101 are all mounted on a carrier plate 113 which rests on the support 110 and has fixed thereto an arm 114 pivotally supported in suitable bearings and actuated by a spring 115 to hold the carrier plate in lowered position, see Fig. 5.

Swinging movement of the carrier plate 113 upwardly permits the control pin 101 to be lifted upwardly in the manner that will be described presently, so that while the carriage is traveling along, the control pin 101 rests on the upper surface of a control tape 116. The control tape 116 is preferably a metal tape or strip that is stretched and fixedly held at its ends so as to extend along the path of travel of the carriage and is provided with a multiplicity of holes 117 arranged at any desired intervals along the tape, and constituting the stations or predetermined points at which the carriage is stopped in its travel and a watering cycle started.

Referring to Fig. 9, as the carriage travels along, the control pin 101 is in the position indicated in dotted lines resting on the upper surface of the stationary metal tape 116, and when the control pin 101 reaches a hole 117 in the tape, it drops into the hole and the parts initially occupy the position shown in full lines in Fig. 9 at the instant when the pin falls. The metal tape being fixed holds the pin 101 against further movement while the carriage continues its travel a slight distance until the posts 103, which are fixed on the carrier plate 113, reach approximately the position shown in Fig. 10. This movement is permitted by reason of the control pin 101 and its supporting block 99 being attached to the rod 102 which is slidable in the posts 103. During this slight additional movement of the carriage after the control pin 101 enters hole 117, the detent 93, see Fig. 6, is held in the same position as the control pin 101 by reason of the arms 97 and 98, while roller 92 carried by the clutch-shifting member 84 moves along with the carriage until it has traveled past the detent 93 and is released for return movement under the impulse of the spring 85. The clutch-shifting rod 84 then engages the crank arm 64, see Fig. 18, rocking the shaft 62 and swinging the clutch lever 61 from the position shown in Fig. 13 to the position shown in Fig. 15 to stop the carriage and start the watering cycle. At the instant this shifting of the clutch occurs, the carriage stops with the control pin 101 and its associated parts in the position illustrated in Fig. 10, and they remain in this position until the carrier plate 113 is elevated to lift the control pin out of the opening in control tape 116, as shown in Fig. 11.

In order to lift the carrier plate 113 on which the control pin 101 is mounted, the arm 114, which is fixedly connected to the carrier plate 113, is bent laterally at its inner end to afford an arm 118, see Fig. 5, which lies in the path of an arm 119 carried on a rock shaft 121, which in turn has an arm 122 provided with a roller 123 located in the path of a cam 124 fixed on the cam shaft 45.

By this mechanism, during rotation of the cam shaft 45 which takes place as part of the watering cycle, cam 124 rocks the shaft 121 and through the arm 119 moves the arm 118 upwardly from the position shown in Fig. 7 to the position shown in Fig. 8, thus swinging arm 114 and the carrier plate 113 upwardly. The control pin 101 then moves upwardly from the position illustrated in Fig. 10 to that illustrated in Fig. 11 and as soon as the control pin 101 is free from the opening in the control tape, as shown in Fig. 11, spring 112 restores the block 99 and control pin 101 to neutral position against the collar 106, with the control pin slightly in advance of the hole 117 from which it has just previously been lifted, as shown in Fig. 11, and at the same time the rod 95 is restored to its normal neutral position, since it is connected to block 99 by the arms 97 and 98, so that the detent 93 is restored to the path of the roller 92 and is in position to engage behind said roller as in Fig. 6 when the clutch-shifting rod 84 is again moved outwardly by the cam shaft.

It will be understood that upward movement of the control pin 101 as just described to the position shown in Fig. 11 takes place to release the control pin and the detent 93 during the early part of the watering cycle and before cam shaft 45 actuates the clutch-shifting rod 84 to its outermost position. After such lifting of the control pin, arm 119 again moves downwardly and releases arm 118 and the carrier plate 113, on which the control pin is mounted, so that the latter is free to drop down in contact with the upper surface of the control tape 116, as shown in Fig. 11, but cannot drop to its lowermost position until the watering cycle is completed and the carriage has again moved to bring the control pin over another hole in the tape, whereupon the operation as above described is repeated.

The control tape 116 rests in a track 125, see Fig. 12, secured to support 110 and cut away at 120 to permit downward movement of the control pin through the tape 116, and is held down in the track by the spring follower 126 which is mounted on a post 127 held down yieldably by a spring 128, and adapted to be lifted upwardly against the pressure of the spring to permit inserting the tape under the follower when the machine is placed in position in operative relation to the tape. 123 designate guide rollers supported at opposite ends of the track 125 to assist in maintaining the tape in proper relation to the track and control pin as the carriage moves along over the control tape.

The operation of the machine briefly is as follows. With the stationary control tape 116 inserted in position under the control pin 101 in the manner shown in Fig. 9, assuming the dotted line position of the control pin, upon starting the motor the machine starts to travel in one direction or the other, depending upon the position of the manually adjusted clutch 14, see Fig. 5, the main controlling clutch 32 being in the position illustrated in Fig. 13 with the clutch lever arm 63 in its lowered position, and the clutch-shifting member 84 held in its outermost position, as illustrated in Fig. 6, by the detent 93, the clutch-shifting member 84 having been actuated to this position and its spring put under tension by the rotation of the cam shaft during the previous watering cycle. The carriage travels until the control pin 101 reaches the next hole in the control tape 116, whereupon the pin 101 falls to the position illustrated in full lines in Fig. 9. Continued travel of the carriage moves the posts 103 to the position illustrated in Fig. 10 during which movement the control pin 101 remains engaged with the tape and is thereby held against further movement. Such additional movement of the carriage operates to move roller 92 out of engagement with the detent 93, releasing the clutch-shifting member 84 which thereupon operates the rock shaft 62 and clutch lever 61 to throw the clutch 32 over into position to turn the bevel pinion 43 and start the watering cycle.

During the watering cycle, the watering head is moved laterally and returned and the water-supply valve opened and closed, and while this is taking place, the cam 124 on cam shaft 45 operates the arm 119 to elevate the control pin carrier plate and lift the control pin 101 out of the hole in the control tape, whereupon the control pin 101 is returned by spring 108 or spring 112 to its neutral or intermediate position between the posts 103, depending upon the direction of travel of the carriage, as illustrated in Fig. 11. This movement of the control pin 101 and block 99 also carries the detent 93, which is mounted on the slidable rod 95, to its normal position in the path of the roller 92 on the clutch-shifting member 84.

Following this, the control pin carrier plate is released by further rotation of cam 124, and the control pin permitted to engage the upper surface of the control tape 116 slightly in advance of the opening 117 in position to be moved along on top of the tape during the next travel movement of the carriage. During the operations just described, rotation of the cam shaft 45 and cam 88 causes outward movement of the clutch-shifting member 84 from its normal position illustrated in Fig. 5 to its outermost position in Fig. 6, during which the spring 85 is compressed and roller 92 moved past the detent 93, which under the impulse of its spring, moves behind the roller 92 to hold the spring-actuated clutch-shifting member in position for another operation of the clutch to start the watering cycle when the carriage moves along to the next hole in the control tape. During the watering cycle, rotation of cam shaft 45 and cam 73 withdraws the clutch-shifting frame carrying the dog 77, compressing the spring 74, and the cam 73 is so formed that at the completion of the watering cycle, the highest point of the cam has passed beyond the roller on the operating arm of the clutch-shifting frame, releasing the latter for return movement under the action of the spring 74. During such return movement, the dog 77 engages the arm 63 of the clutch lever 61 and moves the clutch out of engagement with pinion 43 and into engagement with the sleeve 33, which starts travel of the carriage, and the operation is repeated.

While the invention has been described in relation to a specific structural embodiment, it is not confined to the details herein disclosed, and this application is intended to cover such modified arrangements or adaptations as may come within the purposes of the improvements and the scope of the following claims.

We claim:

1. In a watering machine, the combination with a carriage, watering mechanism mounted on the carriage, carriage-driving mechanism mounted on the carriage, and a motor, of operating connections between the motor and the watering mechanism and carriage-driving mechanism including automatically shifting means connected to the watering mechanism and carriage-driving mechanism and acting to start the watering mechanism upon stopping the carriage-driving mechanism and start the carriage-driving mechanism upon stopping the watering mechanism.

2. In a watering machine, the combination with a carriage, watering mechanism mounted on the carriage and operating during intermittent watering cycles, and carriage-driving mechanism mounted on the carriage, of control means operatively connected to the carriage-driving mechanism and watering mechanism and located along the path of travel of the carriage, a control member mounted on the carriage and cooperating with said control means at predetermined points, mechanism operatively connected to the carriage-driving mechanism and watering mechanism and governed by said control member acting automatically to stop movement of the carriage-driving mechanism and to start movement of the watering mechanism upon stopping the carriage-driving mechanism, and means controlled by the watering mechanism acting automatically to stop the watering mechanism and to start movement of the carriage-driving mechanism after a predetermined interval upon completion of a watering cycle.

3. In a watering machine, the combination with a carriage, watering mechanism mounted on the carriage and operating during intermittent watering cycles, carriage-driving mechanism mounted on the carriage, a motor, and operating connections between the motor and the watering mechanism and carriage-driving mechanism, of control means operatively connected to the carriage-driving mechanism and watering mechanism and located along the path of travel of the carriage, a control member mounted on the carriage and cooperating with said control means at predetermined points, mechanism operatively connected to the watering mechanism and carriage-driving mechanism and governed by said control member acting automatically to interrupt said connections to the carriage-driving mechanism and to establish connections to the watering mechanism, and means connected to and controlled by the watering mechanism acting automatically to interrupt said connections to the watering mechanism and to establish connections to the carriage-driving mechanism after a predetermined interval upon completion of a watering cycle.

4. In a watering machine, the combination with a carriage, watering mechanism mounted on the carriage and operating during intermittent watering cycles, carriage-driving mechanism mounted on the carriage, a motor, and operating connections between the motor and the watering mechanism and carriage-driving mechanism including a clutch operable to connect the motor with the watering mechanism and with the carriage-driving mechanism alternately, of a control member, and mechanism operatively connected to the watering mechanism and carriage-driving mechanism and governed by said control member acting automatically to move said clutch into position to stop movement of the carriage-driving mechanism and to start movement of the watering mechanism and to move the clutch into position to stop the watering mechanism and to start the carriage-driving mechanism after a predetermined interval upon completion of a watering cycle.

5. In a watering machine, the combination with a carriage, watering mechanism mounted on the carriage and operating during intermittent water cycles, carriage-driving mechanism mounted on the carriage, a motor, and operating connections between the motor and the watering mechanism and carriage-driving mechanism including a clutch operable to connect the motor with the watering mechanism and with the carriage-driving mechanism alternately, of control means located along the path of travel of the carriage, a control member mounted on the carriage and cooperating with said control means, mechanism governed by said control member acting automatically to move said clutch to stop movement of the carriage-driving mechanism and to start movement of the watering mechanism at a predetermined point, and means controlled by the watering mechanism acting automatically to move the clutch into position to stop the watering mechanism and to start the carriage-driving mechanism upon completion of a watering cycle.

6. In a watering machine, the combination with a carriage, watering mechanism mounted on the carriage and operating during intermittent watering cycles, carriage-driving mechanism mounted on the carriage, a motor, and operating connections between the motor and the watering mechanism and carriage-driving mechanism including a clutch operable to connect the motor with the watering mechanism and with the carriage-driving mechanism alternately, of clutch-shifting mechanisms including actuating springs, cams driven by the watering mechanism and operable to tension the actuating springs of said clutch-shifting mechanisms, control means located along the path of travel of the carriage, and a control member mounted on the carriage and cooperating with said control means to release one of said clutch-shifting mechanisms at a predetermined point in the path of travel of the carriage, said last mentioned clutch-shifting mechanism operating to shift the clutch into position to stop movement of the carriage-driving mechanism and to operate the watering mechanism, and the other of said clutch-shifting mechanisms acting automatically to move the clutch into position to stop the watering mechanism and to operate the carriage-driving mechanism upon completion of a watering cycle.

7. In a watering machine, the combination with a carriage, of watering mechanism mounted on the carriage operating during intermittent watering cycles and including a watering head, water-supply means connected with the watering head, a valve controlling said water supply means, the watering mechanism including a cam shaft, a cam thereon operatively associated with said valve, carriage-driving mechanism mounted on the carriage, a motor, operating connections between the motor and the watering mechanism and carriage-driving mechanism including a clutch operable to connect the motor with the watering mechanism and with the carriage-driving mechanism alternately, control means located along the path of travel of the carriage, a clutch-shifting mechanism operable to shift the clutch to position for operating the carriage-driving mechanism upon completion of a watering cycle, a spring for actuating said clutch-shifting mechanism, a cam on said cam shaft cooperating with said clutch-shifting mechanism to tension its spring, a clutch-shifting member operable to shift the clutch to position for operating the watering mechanism, a spring for actuating said clutch-shifting member, a detent positionable in the path of said clutch-shifting member for holding the latter in its outermost position, said detent being slidably mounted on the carriage for movement crosswise of the path of said clutch-shifting member, a control pin cooperating with said control means and operatively connected with said detent for horizontal movement therewith, the control pin being movable vertically independently of the detent, a swingingly mounted carrier on which said control pin is slidably mounted, and spring means acting to hold the control pin intermediate the ends of the carrier.

8. In a watering machine, the combination with a carriage, of watering mechanism mounted on the carriage operating during intermittent watering cycles and including a cam shaft, carriage-driving mechanism mounted on the carriage, a motor, and operating connections between the motor and the watering mechanism and carriage-driving mechanism including a clutch operable to connect the motor with the watering mechanism and with the carriage-driving mechanism alternately, control means located along the path of travel of the carriage, a clutch-shifting mechanism operable to shift the clutch to position for operating the carriage-driving mechanism upon completion of a watering cycle, a spring for actuating said clutch-shifting mechanism, a cam on said cam shaft cooperating with said clutch-shifting mechanism to tension its spring, a clutch-shifting member operable to shift the clutch to position for operating the watering mechanism, a spring for actuating said clutch-shifting member, a detent positionable in the path of said clutch-shifting member for holding the latter in its outermost position, said detent being slidably mounted on the carriage for movement crosswise of the path of said clutch-shifting member, a control pin cooperating with said control means and operatively connected with said detent for horizontal movement therewith, the control pin being movable vertically independently of the detent, a swingingly mounted carrier on which said control pin is slidably mounted, and spring means acting to hold the control pin intermediate the ends of the carrier.

9. In a watering machine, the combination with a carriage, watering mechanism mounted on the carriage operating during intermittent watering cycles and including a cam shaft, carriage-driving mechanism mounted on the carriage, a motor, and operating connections between the motor and the watering mechanism and carriage-driving mechanism including a clutch operable to connect the motor with the watering mechanism and with the carriage-driving mechanism alternately, of a clutch-shifting mechanism operable to shift the clutch to position for operating the carriage-driving mechanism upon completion of a watering cycle, said clutch-shifting mechanism including a reciprocable frame movable parallel to said cam shaft, a spring for actuating said frame endwise in one direction, a dog pivotally mounted on said frame, a spring holding the dog in normal position, a clutch-operating lever having an arm positioned in one path of said dog during the watering cycle, an operating arm carried by said reciprocable frame, and a cam on said cam shaft engageable with said operating arm to move the frame in one direction and compress its spring, said dog moving under the clutch arm and yielding against its spring during movement of the clutch-shifting frame in one direction and acting to depress said arm and shift the clutch during return movement of the clutch-shifting frame.

10. In a watering machine, the combination with a carriage, watering mechanism mounted on the carriage including a cam shaft, carriage-driving mechanism mounted on the carriage, a motor, and operating connections between the motor and the watering mechanism and carriage-driving mechanism including a clutch operable to connect the motor with the watering mechanism and with the carriage-driving mechanism alternately, of control means located along the path of travel of the carriage, a clutch-operating lever, a rock shaft on which the clutch lever is mounted, an arm on said rock shaft, a clutch-shifting member movable into engagement with said arm to shift the clutch out of engagement with the carriage-driving mechanism and into position to operate the watering mechanism, a spring for operating said clutch-shifting member, a laterally movably detent that is positionable to hold said clutch-shifting member in its outermost position, and a control pin cooperating with said control means and operatively connected with said detent for horizontal movement therewith, the control pin being movable vertically independently of the detent, a swingingly mounted carrier on which the control pin is slidably mounted, and spring means acting to hold the control pin normally intermediate the ends of the carrier.

11. In a watering machine, the combination with a carriage, watering mechanism mounted on the carriage including a cam shaft, carriage-driving mechanism mounted on the carriage, a motor, and operating connections between the motor and the watering mechanism and carriage-driving mechanism including a clutch operable to connect the motor with the watering mechanism and with the carriage-driving mechanism alternately, of control means located along the path of travel of the carriage, a clutch-operating lever, a rock shaft on which the clutch lever is mounted, an arm on said rock shaft, a clutch-shifting member movable into engagement with said arm to shift the clutch out of engagement with the carriage-driving mechanism and into position to operate the watering mechanism, a spring for operating said clutch-shifting member, a detent positionable in the path of said clutch-shifting member for holding the latter in its outermost position, a rod on which said detent is mounted, said rod being arranged for sliding movement crosswise of the path of said clutch-shifting member, a pair of spaced vertical guide members carried by said rod, a control pin, a block on which said control pin is mounted, an arm projecting laterally from said block and engaging between the aforementioned guide members on the detent rod, a swingingly mounted carrier on which said control pin and block are slidably mounted, spring means acting to hold said block and control pin normally intermediate the ends of the carrier, means for elevating said carrier, and a cam on said cam shaft connected with said elevating means and acting to effect raising of the control pin carrier previously to outward movement of the clutch-shifting member and thereafter to release the control pin carrier.

12. In a watering machine, the combination with a carriage, watering mechanism mounted on the carriage including a cam shaft, carriage-driving mechanism mounted on the carriage, a motor, and operating connections between the motor and the watering mechanism and carriage-driving mechanism including a clutch operable to connect the motor with the watering mechanism and with the carriage-driving mechanism alternately, of control means located along the path of travel of the carriage, a clutch-operating lever, a rock shaft on which the clutch is mounted, an arm on said rock shaft, a clutch-shifting member movable into engagement with said arm to shift the clutch out of engagement with the carriage-driving mechanism and into position to operate the watering mechanism, a spring for operating said clutch-shifting member, a detent positionable in the path of said clutch-shifting member for holding the latter in its outermost position, a slidable rod on which said detent is mounted, a pair of spaced vertical guide members carried by said rod, a swingingly mounted carrier provided with a pair of posts, a central rod slidably supported on said posts, a block carried by said rod and provided with a downwardly projecting control pin, a laterally extending arm carried by said block and engaging between the vertical guide members of the detent rod, spring-supporting rods slidably mounted in said posts above and below said central rod and slidable through openings in the block, collars fixed to the top and bottom spring-supporting rods respectively between the posts and the ends of the rods and acting to limit inward movement of the rods, collars fixed to the top and bottom rods respectively between the posts and the block and determining the intermediate position of the latter, and springs located on the top and bottom rods between the last mentioned collars and the posts and acting to hold the control pin and block yieldably in position intermediate the posts.

13. In a watering machine the combination with a carriage, watering mechanism mounted on the carriage and operating during intermittent watering cycles, and carriage-driving mechanism mounted on the carriage, of control means located along the path of travel of the carriage and including a stationary strip provided with holes determining the points at which the carriage stops for watering, devices governed by the control means acting to stop the carriage-driving mechanism and start the watering mechanism, said devices including a vertically movable carrier, a pin yieldably supported for horizontal movement on said carrier and engageable with a hole in said strip, means acting automatically to elevate said carrier after the carriage is stopped, and mechanism controlled by the watering mechanism acting automatically to stop the watering mechanism and to start the carriage-driving mechanism upon completion of a watering cycle.

14. In a watering machine, the combination with a carriage movable in either direction, watering mechanism mounted on the carriage, and carriage-driving mechanism mounted on the carriage, of control means located along the path of travel of the carriage and including a stationary strip provided with holes determining the points at which the carriage stops for watering, devices governed by the control means acting to stop the carriage-driivng mechanism and start the watering mechanism, said devices including a swingingly mounted carrier provided with a pair of posts, a central rod slidably supported on said posts, a block carried by said rod and provided with a downwardly projecting control pin engageable with a hole in said strip, spring-supporting rods slidably mounted in said posts above and below said central rod and slidable through openings in said block, collars fixed to the top and bottom spring-supporting rods respectively between the posts and the ends of the rods and acting to limit inward movement of the rods, collars fixed to the top and bottom rods respectively between the posts and the block for determining the intermediate position of the block, and springs located on the top and bottom rods between the last mentioned collars and the posts and acting to hold the control pin and block yieldably in position intermediate the posts.

15. In a watering machine, the combination with a carriage movable in either direction, watering mechanism mounted on the carriage, and carriage-driving mechanism mounted on the carriage, of control means located along the path of travel of the carriage and including a stationary strip provided with holes determining the points at which the carriage stops for watering, devices governed by the control means acting to stop the carriage-driving mechanism and start the watering mechanism, said devices including a clutch-shifting member, a detent positionable in the path of said clutch-shifting member for holding the latter in its outermost position, a slidable rod on which said detent is mounted, a pair of spaced vertical guide members carried by said rod, a swingingly mounted carrier provided with a pair of posts, a central rod slidably supported on said posts, a block carried by said rod and provided with a downwardly projecting control pin, a laterally extending arm carried by said block and engaging between the vertical guide members of the detent rod, spring-supporting rods slidably mounted in said posts above and below said central rod and slidable through openings in the block, collars fixed to the top and bottom spring-supporting rods respectively between the posts and the ends of the rods and acting to limit inward movement of the rods, collars fixed to the top and bottom rods respectively between the posts and the block and determining the intermediate position of the latter, and springs located on the top and bottom rods between the last mentioned collars and the posts and acting to hold the control pin and block yieldably in position intermediate the posts.

RICHARD C. HART.
JOHN A. BITTEL.

REFERENCES CITED

The following references are of record in the file of this patent:

UNITED STATES PATENTS

| Number | Name | Date |
| --- | --- | --- |
| 484,294 | Carlson | Oct. 11, 1892 |
| 599,195 | Ready | Feb. 15, 1898 |
| 608,192 | Clazier | Aug. 2, 1898 |
| 738,748 | Aldrich | Sept. 15, 1903 |
| 1,017,578 | McMillan | Feb. 13, 1912 |
| 1,079,817 | Williamson | Nov. 25, 1913 |
| 1,107,119 | Searle | Aug. 11, 1914 |
| 1,167,629 | Coles | Jan. 11, 1916 |
| 1,176,856 | Salmond | Mar. 28, 1916 |
| 1,658,202 | Jones | Feb. 7, 1928 |
| 2,026,678 | Hefner | Jan. 7, 1936 |
| 2,192,433 | Cornelison | Mar. 5, 1940 |
| 2,367,594 | Madison | Jan. 16, 1945 |